(12) United States Patent
Berberich et al.

(10) Patent No.: US 9,766,148 B2
(45) Date of Patent: Sep. 19, 2017

(54) DIAPHRAGM SEAL WITH ADAPTER

(71) Applicant: WIKA Alexander Wiegand SE & Co. KG, Klingenberg (DE)

(72) Inventors: Thomas Berberich, Buergstadt (DE); Udo Hoerning, Eichenbuehl (DE); Albrecht Kalisch, Grossheubach (DE); Heiko Kern, Klingenberg (DE); Horst Weis-Schneider, Dammbach (DE)

(73) Assignee: WIKA Alexander Wiegand SE & Co. KG, Klingenberg (DE)

( * ) Notice: Subject to any disclaimer, the term of this patent is extended or adjusted under 35 U.S.C. 154(b) by 103 days.

(21) Appl. No.: 14/683,575

(22) Filed: Apr. 10, 2015

(65) Prior Publication Data
US 2015/0292972 A1 Oct. 15, 2015

(30) Foreign Application Priority Data
Apr. 10, 2014 (DE) ...................... 10 2014 005 409

(51) Int. Cl.
| | | |
|---|---|---|
| G01L 7/00 | (2006.01) |
| G01L 7/08 | (2006.01) |
| G01L 9/00 | (2006.01) |
| G01L 19/06 | (2006.01) |
| G01L 19/00 | (2006.01) |
| G01L 19/04 | (2006.01) |

(52) U.S. Cl.
CPC ...... *G01L 19/0645* (2013.01); *G01L 19/0046* (2013.01); *G01L 19/04* (2013.01)

(58) Field of Classification Search
None
See application file for complete search history.

(56) References Cited

U.S. PATENT DOCUMENTS

| | | | | |
|---|---|---|---|---|
| 4,192,192 A * | 3/1980 | Schnell | ............... | G01L 19/0645 73/706 |
| 5,652,391 A * | 7/1997 | Kingsford | ........... | G01L 19/0681 73/706 |
| 6,120,033 A * | 9/2000 | Filippi | ................ | G01L 19/0046 277/315 |
| 6,715,356 B2 * | 4/2004 | Gerst | .................... | G01L 9/0075 73/715 |
| 7,047,811 B2 * | 5/2006 | Sherman | ............. | G01L 19/0092 73/708 |
| 9,429,490 B2 * | 8/2016 | Blatherwick | ......... | G01L 19/003 |

\* cited by examiner

*Primary Examiner* — Peter Macchiarolo
*Assistant Examiner* — Jermaine Jenkins
(74) *Attorney, Agent, or Firm* — Muncy, Geissler, Olds & Lowe, P.C.

(57) ABSTRACT

A diaphragm seal system, which is filled with a pressure transmission medium, wherein the pressure measurement instrument is welded by its connecting thread into a connecting adapter.

16 Claims, 8 Drawing Sheets

DIAPHRAGM SEAL WITH ADAPTER

This nonprovisional application claims priority under 35 U.S.C. §119(a) to German Patent Application No. 10 2014 005 409.8, which was filed in Germany on Apr. 10, 2014, and which is herein incorporated by reference.

BACKGROUND OF THE INVENTION

Field of the Invention

The invention relates to a diaphragm seal system having a pressure measurement instrument with a measuring element, and a flange with a sensor membrane and a connecting adapter, wherein pressure transmission is accomplished from a process side through the measurement membrane and via a pressure transmission fluid through the adapter to the pressure sensor path with the measuring element, and wherein the adapter is optimized for sealed assembly with threaded pressure connections of pressure measurement instruments.

Description of the Background Art

Pressure measurement instruments have heretofore been used for which the pressure measurement instrument connection had to be produced separately, in particular by means of welding, for a sealed connection.

SUMMARY OF THE INVENTION

It is therefore an object of the invention is to provide an economical sealed coupling to diaphragm seals for standard pressure measurement instruments. In particular, easy bleeding and filling should also be made possible.

In an embodiment, an adapter is provided such that even pressure measurement instruments with threaded connections can be connected to the diaphragm seal through the adapter in a sealed manner, in particular by welding.

An embodiment of the invention provides a structural adapter with which inexpensively available standard measurement instruments with threaded connections can be installed in the adapter in a robust, secure and sealed manner by welding.

Quick and reliable bleeding and filling, in particular, should be possible with regard to undercuts in the welded-in threaded region.

Moreover, a reservoir of pressure transmission fluid with special properties is formed.

According to an embodiment the invention, the diaphragm seal has: a pressure measurement instrument, having a measuring element in the form of a Bourdon tube, a membrane, or an alternative elastic measuring element, as well as a connected analysis device that displays pressure values on a display, a connection region, which is threaded, out of which the pressure sensor path proceeds. The display here can be implemented mechanically with a movement, needle, and dial, or can also be fully electronic with a takeoff for the motions or expansions of the measuring element.

A section of the thread is accommodated in the adapter according to an embodiment of the invention in that the adapter has a recessed opening formed thereon that is oriented toward an outer geometry of the thread and in terms of dimensions is suitably made somewhat oversize such that the connecting thread of the pressure measurement instrument can be inserted and welded in place. In this context, a section of the threaded zone is integrally connected in a sealed manner, preferably via TIG welding in an inert atmosphere.

In another assembly step, the adapter is or has been joined to the measurement membrane flange, likewise in a sealed manner, for example, by welding. This can be done ahead of time or afterwards as dictated by requirements.

In any case, the adapter also has an opening for bleeding and subsequent filling with the pressure transmission fluid.

By means of the pressure transmission fluid, for example an oil, a process pressure present at the membrane can then be conducted via the passage through the adapter to the pressure measurement instrument without the possibility that the measuring medium can contaminate the measuring sensor or the measurement path.

Since a threaded section to the adapter is enclosed due to the welding such that it is difficult to bleed or fill, it is fluidically reached in an improved manner through exposed channels according to the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
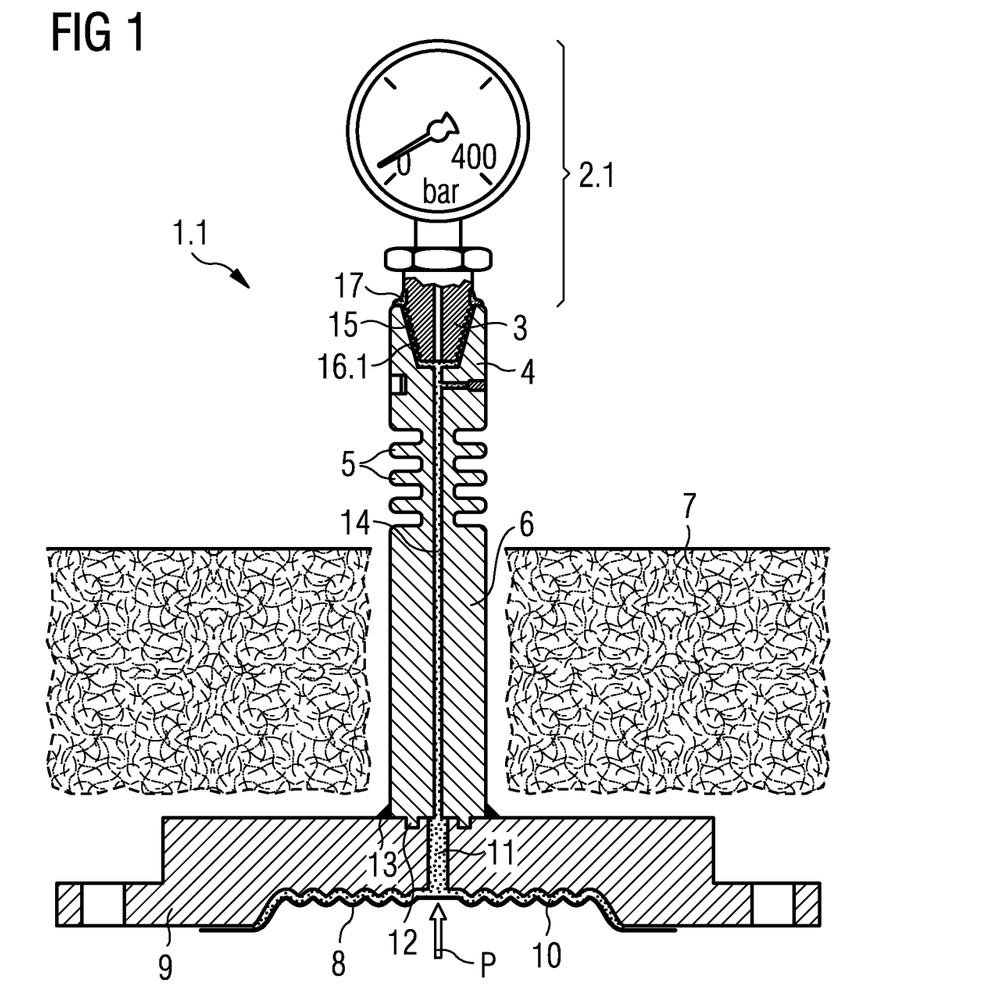
FIG. 1 shows a cross-section of a diaphragm seal system according to an embodiment.

The diaphragm seal system 1.1 includes a pressure measurement instrument 2.1 with a threaded pressure connection 3 that is welded in place in the adapter 4 in a sealed manner.

The adapter 4 can have cooling fins 5 that reduce a temperature from the process side "P" toward the measurement instrument. To this end, the adapter 4 is additionally provided with an extension zone 6 facing the process side, which in particular passes through an insulating zone 7 and establishes a pressure connection to a measurement membrane 8 at a measurement flange 9. The measurement flange 9 also has a measurement chamber 10 that is closed off by the membrane 8, and a bore 11 that passes out of the measurement flange 9 toward the adapter 4 on a side facing away from the membrane 8.

On the side facing away from the membrane 8, the adapter 4 can be oriented toward the measurement flange 9 through a groove 12 and is attached in a sealed manner by a weld 13.

A pressure path 14 of the adapter 4 can thus establish a fluidic connection from the measurement chamber 10 through the bore 11 to a pressure sensor path 15 of the pressure measurement instrument 2.1.

The pressure sensor connection 3, which is provided with an external thread 16.1, is thus accommodated in the adapter 4 and is attached in a sealed manner with a weld 17.

Figure 2:
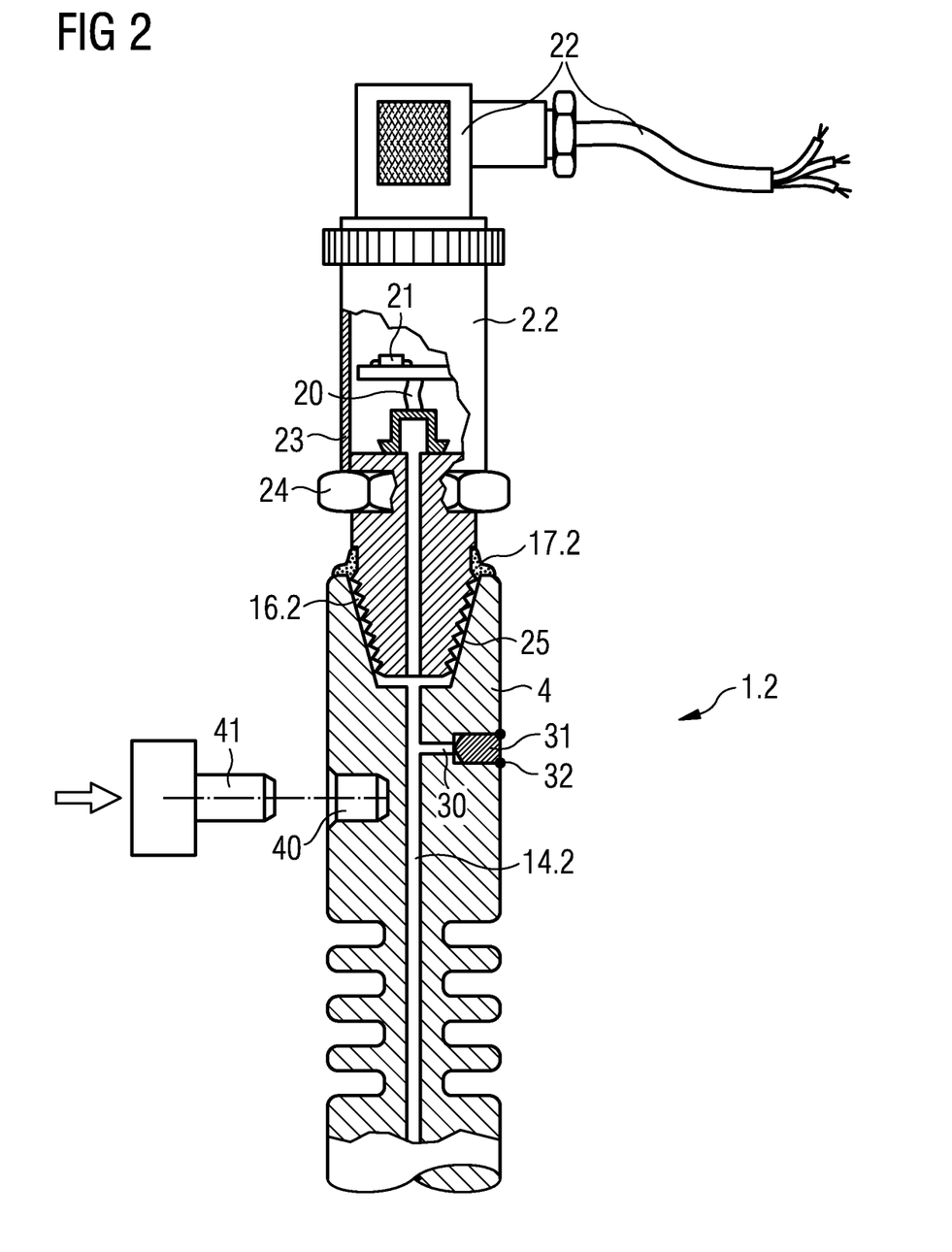
FIG. 2 shows a cross-section of a diaphragm seal system according to an embodiment.

FIG. 2 shows a cross-section of a diaphragm seal system 1.2 in an exemplary embodiment according to the invention, wherein the pressure measurement instrument 2.2 is equipped with a measuring element in the form of a membrane 20 and an electronic analysis unit 21 that passes the measurement signal to a control station or external display through a connector or cable 22.

To this end, the measurement instrument also has a housing 23, which is connected in a sealed manner to the pressure connection, which preferably has an external hexagon 24.

Adjacent to and below the hexagon 24 is the pressure connection region, which is provided with a conical thread 16.2 and is accommodated in a conical recess 25 of the adapter 4. After a circumferential welding 17.2, the pressure measurement instrument 2.2 is mechanically secured to the adapter, and at the same time a pressure-tight connection is established between a pressure sensor path 15.2 and the pressure path 14.2 of the adapter 4.

The thread 16.2, which is supported in the conical recess 25 of the adapter 4, in particular on the diameter of the cone toward the bottom in the taper, advantageously contributes to additional mechanical securing.

Moreover the adapter 4 can have a fill bore 30 through which the pressure path is to be bled, evacuated, and filled with a pressure transmission fluid. The opening can be sealed shut thereafter, for example, with a pin 31 and/or by welding 32.

In addition, the adapter 4 has an interlocking recess 40 for orientation and securing during assembly and welding. This recess 40 can be implemented as a bore, and can be entered by a retaining pin 41.

Figure 3:
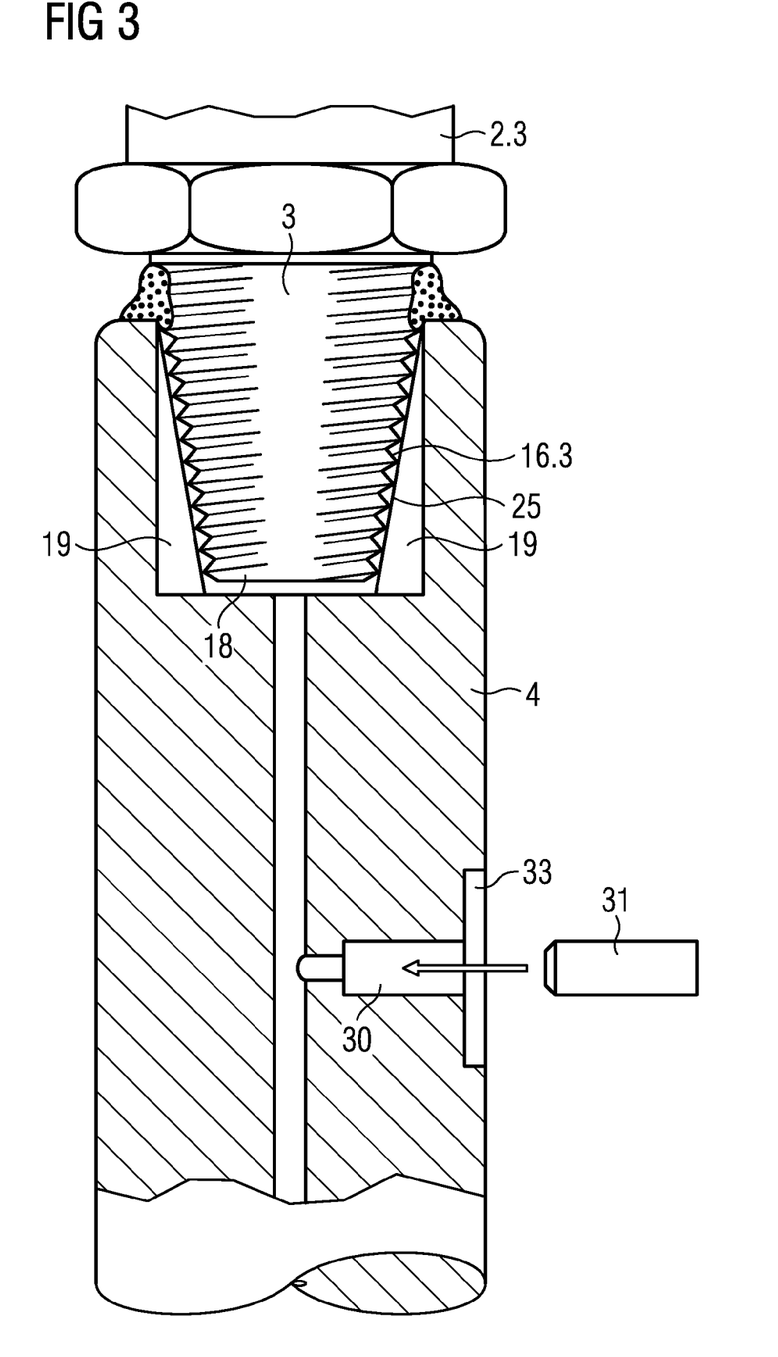
FIG. 3 shows a cross-section of an adapter according to an embodiment.

FIG. 3 shows a cross-section of an adapter 4 in another embodiment according to the invention. In this exemplary embodiment, the pressure connection region 3 of the pressure measurement instrument 2.3 is provided with a conical quarter inch NPT thread 16.3, which is accommodated in the conical recess 25 of the adapter 4 in that the threaded sections partially rest against the cone.

Through appropriate design of the dimensions, a lower space 18 then remains free below the threaded connection.

The conical recess 25 is extended in the form of a shaped channel 19 such that the thread turns 16.3 are reachable through the fill opening 30 during filling with a pressure transmission oil. After this, the opening is closed with a pin 31 and welded. In this context, a recessed zone 33 around the fill bore 30 permits sealing by welding without depositing anything to the outside beyond the outer diameter of the adapter 4.

After the circumferential welding, the pressure measurement instrument is mechanically secured to the adapter here as well, and at the same time a pressure-tight connection is established between the adapter and the pressure path of the measurement instrument.

Figure 4:
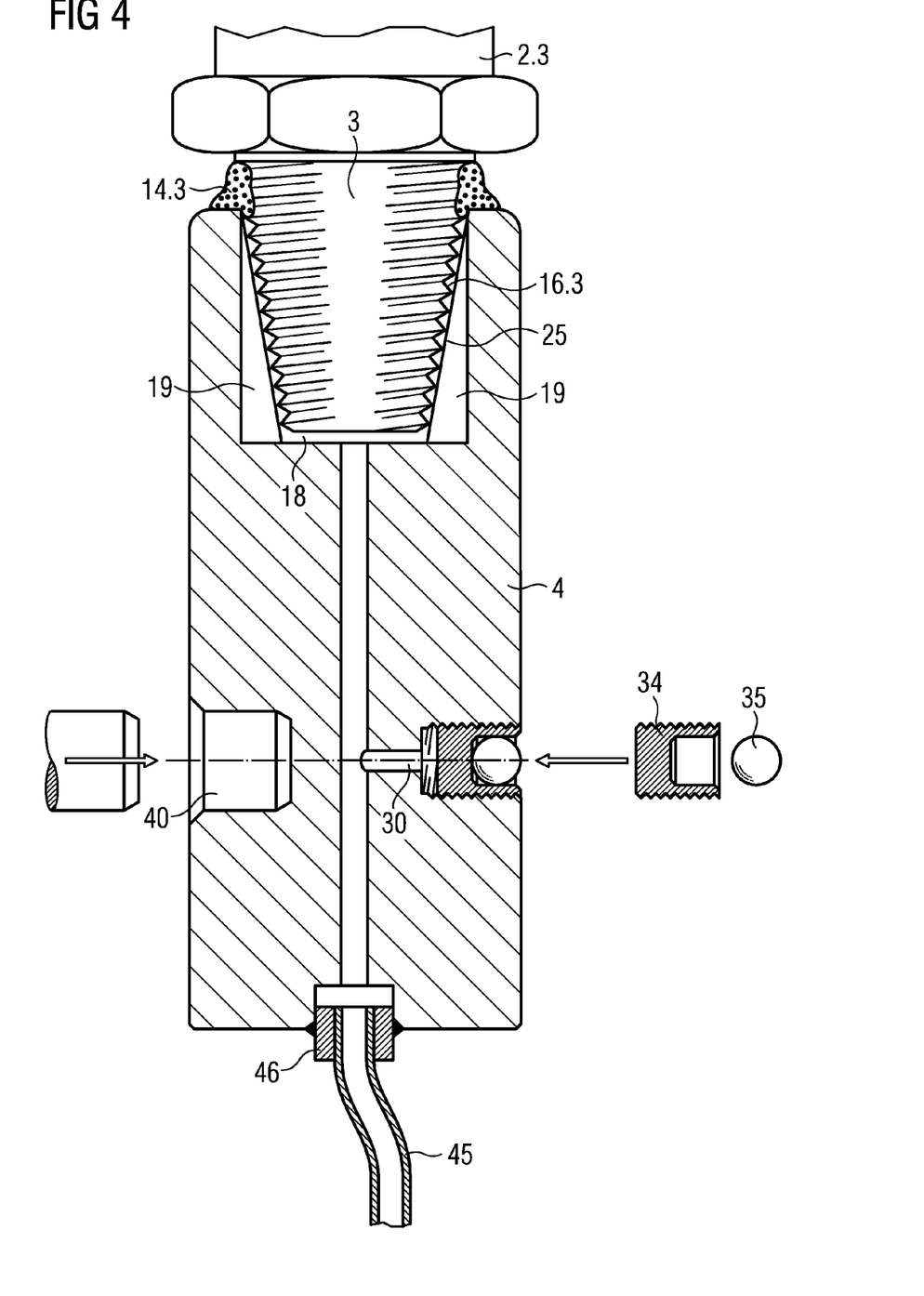
FIG. 4 shows a cross-section of an adapter according to an embodiment.

FIG. 4 shows a cross-section of an adapter 4 in another embodiment according to the invention. In this embodiment, the pressure connection region 3 of the pressure measurement instrument 2.3 is provided with a conical half inch thread 16.3, which is accommodated in the conical recess 25 of the adapter 4, in that the threaded sections partially rest against the cone.

Appropriate relief milling 18 in the lower region of the conical recess 25 creates a channel beneath the threaded connection that reaches the threaded sections through the additionally milled channels 19.

The undercuts and threaded sections 16.3 beneath the weld 17.3 are easily reached during filling with a pressure transmission oil.

Moreover, this produces a reservoir space for pressure transmission fluid, which has a compensating effect on the pressure transmission characteristic of the diaphragm seal due to its distance from the process temperature.

For the purposes of orientation and securing during assembly and filling, the interlocking recess 40 can be aligned on the same axis as the fill bore 30.

Preferably, the fill bore can be closed with a plug 34 that seals the fill bore without welding, for example, by expansion with a pressed-in ball.

In the direction of the measurement membrane, a measurement line 45 can also be welded in via an adapter 46.

Figure 5:
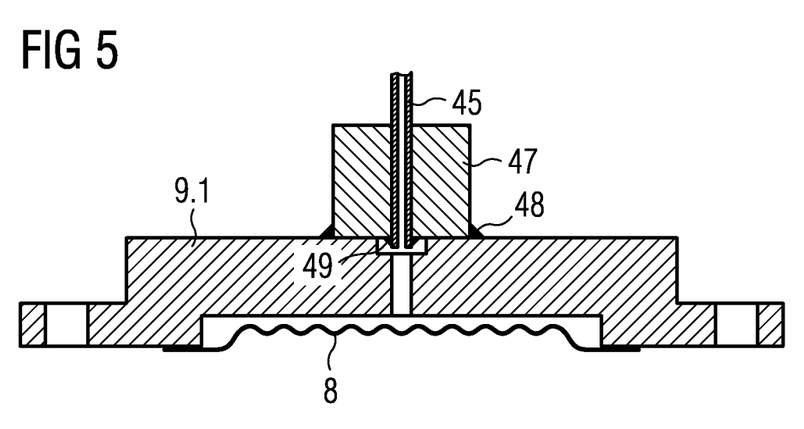
FIG. 5 shows a cross-section of a measurement flange with a measurement membrane.

FIG. 5 shows a cross-section of a measurement flange 9.1 with a measurement membrane 8, to which the measurement line 45 coming from the adapter 4 is attached in a sealed manner via a coupler 47 and welds 48 and 49.

Figure 6:
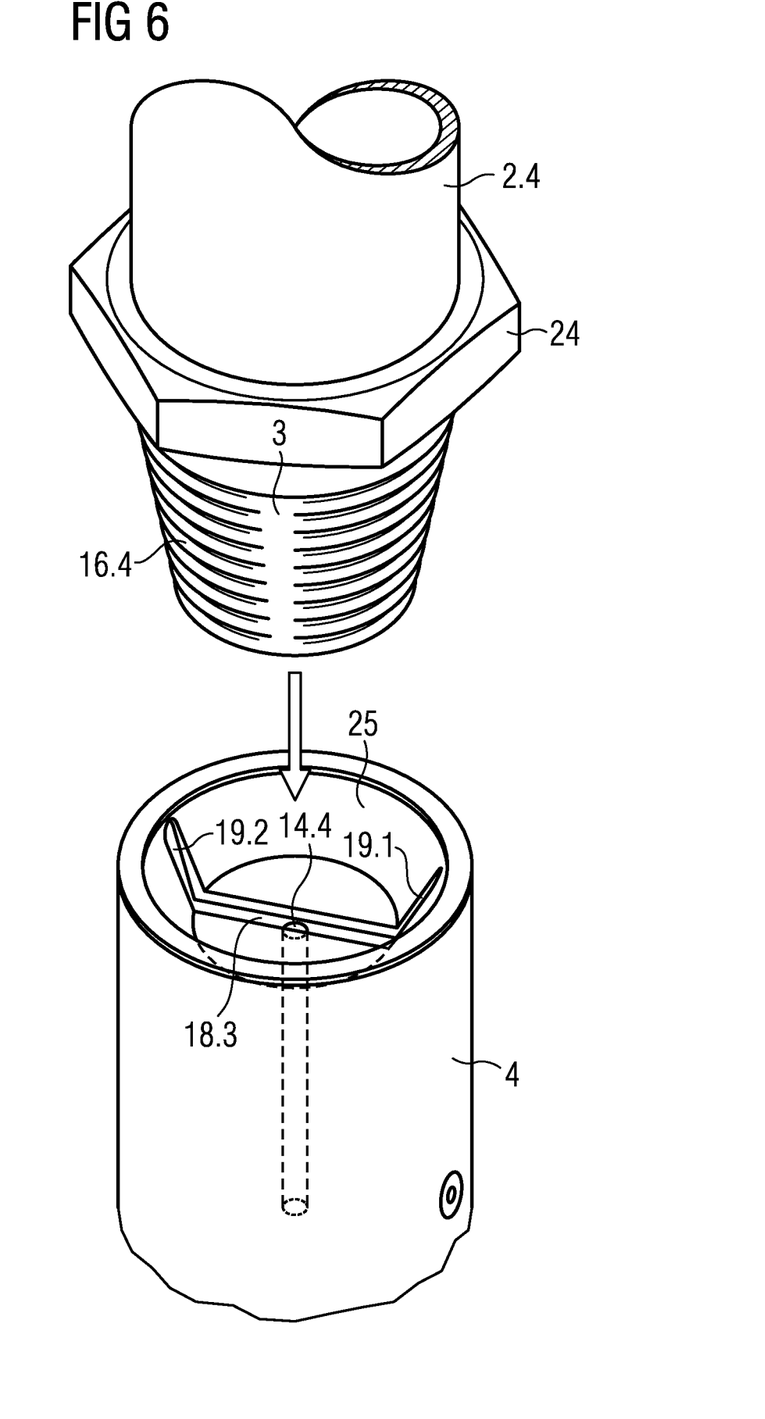
FIG. 6 shows the adapter in a perspective view of the pressure measurement instrument.

FIG. 6 shows the adapter 4 in a perspective view of the pressure measurement instrument 2.4 with its integrally formed hexagon 24 prior to mounting of the pressure connection region 3.

In this embodiment, the conical thread is accommodated in the conical recess 25 of the adapter 4.

Appropriate relief milling 18.3 in the lower region of the conical recess 25 creates at least one channel beneath the threaded connection that reaches the threaded sections 16.4 via the pressure path 14.4 through the additionally milled channels 19.1 and 19.2.

The receptacle of the adapter 4 for the threaded section of the pressure measurement instrument, together with the vertical channel connection 19 and/or horizontal channel connection 18.3, thus ensures a fluidic connection to the pressure path of the adapter.

The pressure path 14.4 of the adapter 4, which can be made of stainless steel, can have a bore diameter in this design of 0.5-2.0 mm.

Figure 7:
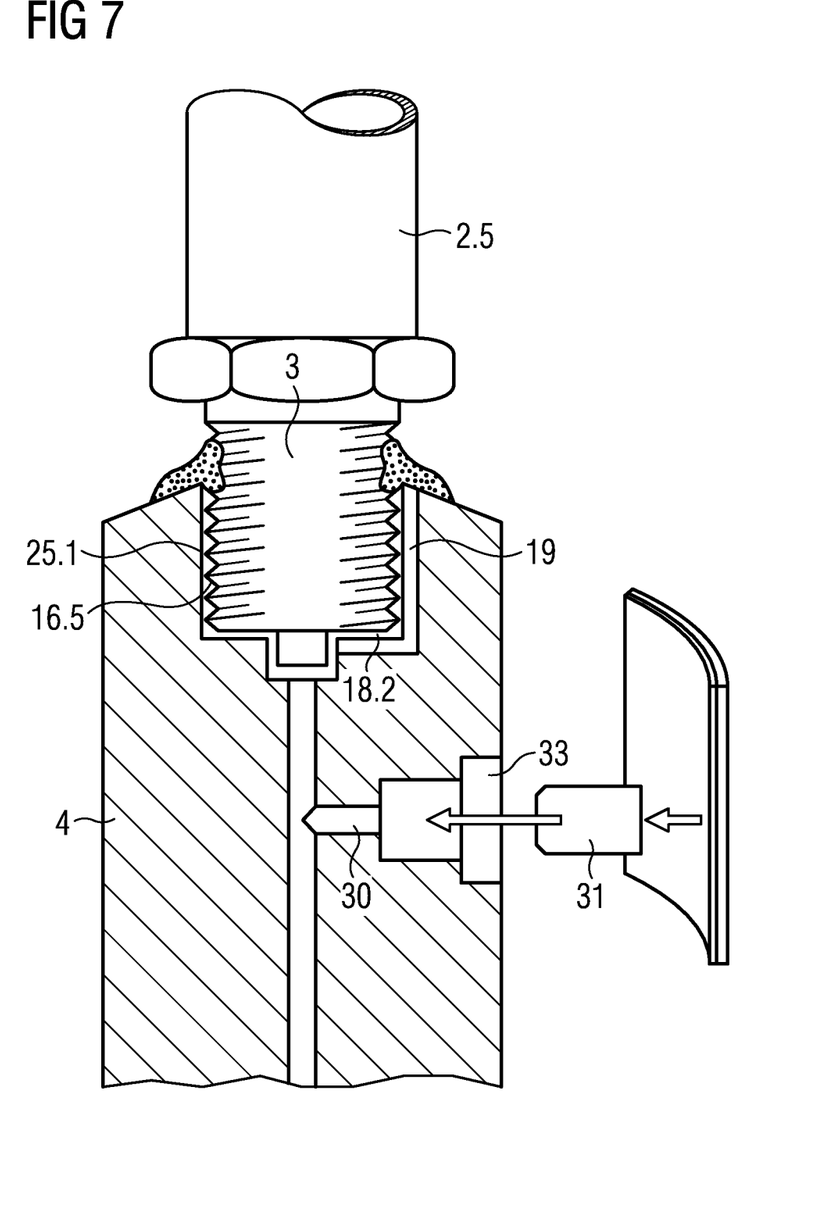
FIG. 7 shows a cross-section of an adapter.

The thread 16.5, as illustrated in FIG. 7, which is supported in the cylindrical recess 25.1 of the adapter 4, in particular on the diameter of the adapter toward the bottom in the direction of the pressure connection, advantageously contributes to additional mechanical securing. Especially when the pressure connection region 3 of the pressure measurement instrument 2.5 is soldered to the adapter 4, for example when both parts are made of copper or copper alloy and are to be joined to one another with hard solder, the pairing of a thread with a bore is advantageous for mechanical, and at the same time pressure-tight, retention of the connection.

In like manner, the channel 19 contributes to the introduction of bonding solder. This is also applicable in the other exemplary embodiments.

The interlocking of the two parts with one another, in particular in the lower region, can be improved through tighter tolerancing of the bore or through a slightly conical design, and supports the sealed retention of the connection. In addition, a pin at the bottom of the thread can optionally engage an additional recess for this purpose, as is shown below the thread 16.5.

FIG. 7 further shows a cross-section of an adapter 4 in another embodiment according to the invention. In this embodiment, the pressure connection region 3 of the pressure measurement instrument 2.5 is provided with a metric thread 16.5, which is accommodated in a cylindrical recess 25.1 of the adapter 4 in that the threaded sections partially rest against the wall of the cylinder, but have some clearance for installation.

By means of appropriate recesses, a lower space 18.2 then remains free, preferably on one side, below the threaded connection.

An additional vertical recess in the shape of a formed or milled channel 19 is enlarged such that the thread turns 16.5 are reachable through the fill opening 30 during filling with a pressure transmission oil.

After this, the opening is closed with a pin 31 and welded. In this context, a recessed zone 33 around the fill bore 30 again permits sealing by welding without depositing anything to the outside beyond the outer diameter of the adapter 4.

After the fill opening is welded, it is provided with, for example, a self-adhesive nameplate or sticker and covered to protect from contamination.

Figure 8:
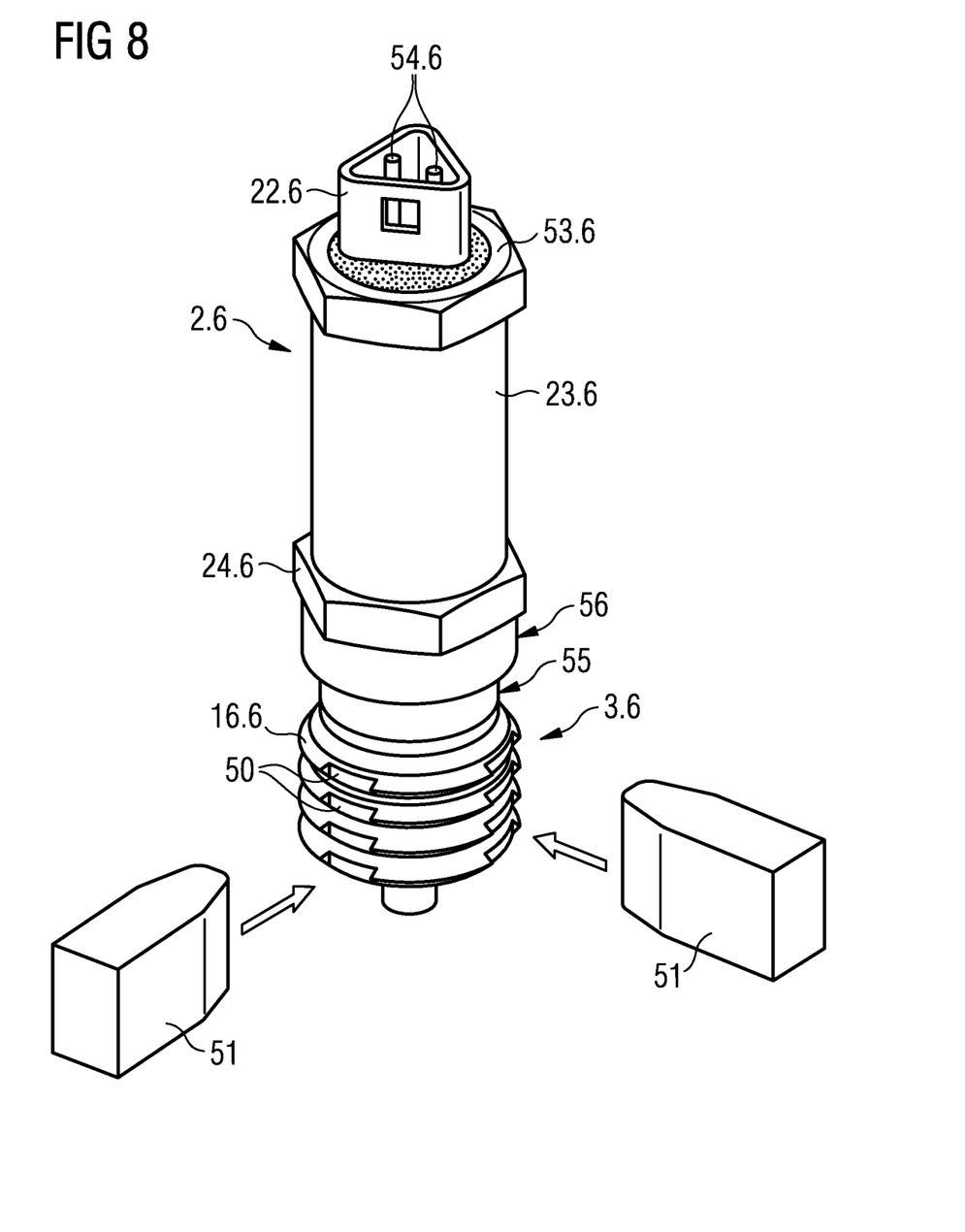
FIG. 8 shows a pressure measurement instrument.

FIG. 8 shows a pressure measurement instrument 2.6, which is prepared at its pressure connection 3.6 to be welded to an adapter.

The pressure measurement instrument 2.6 includes a housing 23.6, which is welded at an upper end to a stainless steel hexagon 53.6 that is molded in a central recess with a plug connection 22.6 and carries pressed-in contacts 54.6 for contact with an internal analysis unit of the sensor element. The housing is welded at its lower end to a collar or hexagon 24.6, which has formed thereon a first shoulder 56 and a second shoulder 55. The pressure measurement instrument is placed on the adapter flush with one of these shoulders and is then circumferentially welded there at one of the circumferential shoulders.

The pressure connection 3.6 of the pressure measurement instrument 2.6, which is provided with a thread 16.6, is then inserted fully into the adapter, and for the purpose of better bleeding, evacuation, or filling of the threaded sections, has partial flats or recesses 50 on its threads that are formed either without cutting by stamping tools 51 or with cutting by milling.

These recesses can be applied, for example, at three places on the circumference of the threads, but other configurations are known to one skilled in the art.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A diaphragm seal system comprising:
a pressure measurement instrument with an elastic measuring element provided therein, the pressure measurement instrument having a pressure connection at one end thereof, the pressure connection being provided with an external thread that forms a threaded section of the pressure measurement instrument;
a connected analysis device that displays pressure values on a display;
a measurement connection flange having a measurement membrane;
an adapter that connects the pressure measurement instrument to the measurement connection flange,
wherein a fluidic pressure connection between the measurement membrane and the elastic measuring element being established through a pressure path of the adapter,
wherein the adapter has, at least on a first end, a recess that accommodates the threaded section of the pressure measurement instrument,
wherein the threaded section is inserted into the recess of the adapter and is connected to the adapter by a circumferential weld, such that the entire adapter is positioned to an exterior of the pressure measurement instrument, and
wherein a second end of the adapter is attached to a first surface of the measurement connection flange and the measurement membrane is attached to a second surface of the measurement connection flange, the first surface opposing the second surface.

2. The diaphragm seal system according to claim 1, wherein the recess of the adapter is conical and wherein the threaded section of the pressure measurement instrument is conical, and is supported in the conical recess of the adapter.

3. The diaphragm seal system according to claim 1, wherein the adapter has cooling fins formed thereon or has a relatively long insulating section.

4. The diaphragm seal system according to claim 1, wherein the pressure connection of the pressure measurement instrument is provided with a collar that sits on or is inserted into the adapter and that is welded to the adapter.

5. The diaphragm seal system according to claim 1, wherein the recess of the adapter is provided with a vertical or horizontal channel that stands in connection with the pressure path of the adapter.

6. The diaphragm seal system according to claim 1, wherein the pressure path of the adapter has a bore diameter of 0.5-2.0 mm.

7. The diaphragm seal system according to claim 1, wherein the pressure connection of the pressure measurement instrument has recesses on portions of the threads of the threaded section that are stamped, milled, or formed.

8. The diaphragm seal system according to claim 1, wherein the external thread of the pressure measurement instrument is a quarter inch or half inch thread that has a conical shape.

9. The diaphragm seal system according to claim 1, wherein the elastic measuring element is a Bourdon tube or a membrane.

10. The diaphragm seal system according to claim 1, wherein the adapter is made of stainless steel.

11. The diaphragm seal system according to claim 1, wherein the adapter has a fill opening that is closed with a pin or plug.

12. The diaphragm seal system according to claim 1, wherein the adapter has a recess formed on its circumference in the form of a bore.

13. The diaphragm seal system according to claim 1, wherein a side wall and a bottom wall of the recess of the adapter are each provided with a recessed channel.

14. The diaphragm seal system according to claim 1, wherein the measurement connection flange has a bore extending therethrough, the bore of the flange being aligned with and connecting to the pressure path of the adapter.

15. A diaphragm seal system comprising:
a pressure measurement instrument with an elastic measuring element, the pressure measurement instrument having a pressure connection at one end thereof, the pressure connection being provided with an external thread that forms a threaded section of the pressure measurement instrument;

a connected analysis device that displays pressure values on a display;

an adapter that connects the pressure measurement instrument to a measurement connection having a measurement membrane, a fluidic pressure connection between the measurement membrane and the elastic measuring element being established through a pressure path of the adapter, wherein the adapter has, at least on one side, a recess that accommodates the threaded section of the pressure measurement instrument, wherein the threaded section is connected to the adapter by a circumferential weld, and wherein the adapter has a fill opening that is closed with a pin or plug, and is additionally covered with an identification plate or sticker to protect from contamination.

16. The diaphragm seal system according to claim 15, wherein the adapter has a recess formed on its circumference in the form of a bore that is suitable for accommodating and orienting during assembly, and wherein the fill opening of the adapter is at a same height or on a same axis as, or is oriented opposite to, the recess for assembly.

\* \* \* \* \*